(12) United States Patent
Nelik

(10) Patent No.: US 6,377,455 B1
(45) Date of Patent: Apr. 23, 2002

(54) COMPUTER COMPONENT COOLING ASSEMBLY

(76) Inventor: Jacob Nelik, 21 Redwood Tree La., Irvine, CA (US) 92612

( * ) Notice: Subject to any disclaimer, the term of this patent is extended or adjusted under 35 U.S.C. 154(b) by 0 days.

(21) Appl. No.: 09/559,005

(22) Filed: Apr. 21, 2000

Related U.S. Application Data

(63) Continuation of application No. 08/931,857, filed on Sep. 16, 1997, now Pat. No. 6,069,792.

(51) Int. Cl.$^7$ .............................. G06F 1/20; H05K 7/20
(52) U.S. Cl. ...................... 361/687; 361/685; 361/695; 361/707; 361/697; 165/80.3; 165/185; 174/16.3
(58) Field of Search ................. 361/679–687, 361/724–727, 694–695, 697, 702, 703, 705, 704, 707; 165/80.3, 185, 80.5, 122–126; 174/15.1

(56) References Cited

U.S. PATENT DOCUMENTS

| | | | |
|---|---|---|---|
| 4,233,644 A | * 11/1980 | Hwang et al. | ............... 361/687 |
| 4,642,715 A | 2/1987 | Ende | |
| 5,220,485 A | 6/1993 | Chakrabarti | |
| 5,339,214 A | 8/1994 | Nelson | |
| 5,440,450 A | 8/1995 | Lau et al. | |
| 5,482,109 A | * 1/1996 | Kunkel | ........................ 361/707 |
| 5,510,954 A | 4/1996 | Wyler | |
| 5,535,094 A | 7/1996 | Nelson et al. | |
| 5,576,932 A | 11/1996 | Bishop et al. | |
| 5,592,366 A | * 1/1997 | Goldman et al. | ........... 361/797 |
| 5,596,483 A | 1/1997 | Wyler | |
| 5,612,852 A | 3/1997 | Leverault et al. | |
| 5,623,597 A | 4/1997 | Kikinis | |
| 5,638,895 A | 6/1997 | Dodson | |
| 5,640,046 A | * 6/1997 | Suzuki et al. | ................ 361/697 |
| 5,650,912 A | 7/1997 | Katsui et al. | |
| 5,712,762 A | * 1/1998 | Webb | .......................... 361/687 |
| 5,796,583 A | * 8/1998 | Gale et al. | ................... 361/704 |
| 5,828,549 A | * 10/1998 | Gandre et al. | ............... 361/695 |

* cited by examiner

Primary Examiner—Leo P. Picard
Assistant Examiner—Lisa Lea-Edmonds
(74) Attorney, Agent, or Firm—Leonard Tachner

(57) ABSTRACT

The conventional rails of a standard computer chassis are removed and elongated heat sink members, having substantially the same general dimensions as the rails, are substituted for the rails to provide highly conductive heat transfer from the hard disk drive to which the heat sink members are connected. Moreover, the heat sink members are provided with channels along their entire length through which air flow can be directed to provide additional heat removal by convection. Air flow is preferably facilitated by use of small fans located at the ends of the heat sink members, at least one such fan for each such heat sink member which fits within the width and height outline of the disk drive/heat sink member combination thereby requiring minimal space and no alteration to existing computer chassis dimensions. In a preferred embodiment, a thermally conductive pad is positioned between the heat sink members and the respective mating surfaces of the disk drive or other component to facilitate enhanced heat conduction therebetween.

15 Claims, 5 Drawing Sheets

COMPUTER COMPONENT COOLING ASSEMBLY

CROSS-RELATED APPLICATION

This application is a continuation of U.S. patent application Ser. No. 08/931,857 filed Sep. 16, 1997, now U.S. Pat. No. 6,069,792.

BACKGROUND OF THE INVENTION

1. Field of the Invention

The present invention relates generally to the field of computers and more specifically to the field of computer component cooling by conductive and convective removal of heat from components such as high speed hard disk drives.

2. Prior Art

Heat dissipation is a constant and significant problem in computers because some components, such as hard disk drives, are relatively sensitive to high temperature. The loss of a hard disk drive can be a catastrophic failure because of the loss of unique data with little, if any chance of recovery. Conventional desk top computers commonly employ a single fan to pull warm air out of the computer chassis. However, expanding memory storage capacity and increasing rotational speeds necessary for shorter access times, make hard disk drives both more sensitive to high temperatures and more likely to generate greater amounts of thermal energy. Thus, the problem of providing adequate heat removal is substantially compounded by the advent of larger capacity and faster mass storage devices. Unfortunately, one cannot simply add more fans because there is limited space in a computer chassis which is normally occupied by a motherboard, CD-ROM, floppy disk drive, power supply, modem, video card, sound card and other interface cards as well as interconnecting ribbon cables and connectors. Accordingly, any additional cooling capability must be designed to enhance cooling of heat sensitive components (i.e., hard disk drives) without requiring significantly more volume within the very confined space within a computer chassis.

A search of the relevant prior art has revealed the following issued U.S. Pat. Nos.

| | |
|---|---|
| 4,642,715 | Ende |
| 5,220,485 | Chakrabarti |
| 5,339,214 | Nelson |
| 5,440,450 | Lau et al |
| 5,510,954 | Wyler |
| 5,535,094 | Nelson et al |
| 5,576,932 | Bishop et al |
| 5,596,483 | Wyler |
| 5,612,852 | Leverault et al |
| 5,623,597 | Kikinis |
| 5,638,895 | Dodson |
| 5,650,912 | Katsui et al |

Of the foregoing patents the following appear to be the more pertinent:

U.S. Pat. No. 5,612,852 to Leverault et al is directed towards a compact housing for a computer workstation. FIG. 1 illustrates a front perspective view of the workstation compact housing 20. FIG. 3 is an exploded perspective view of the structural heat sink 34 of the housing, including horizontal base heat sink 34A and a vertical tower heat sink 34B. The structural heat sink 34 conductively removes heat from heat-generating functional elements within the housing 20 and distributes the heat to other regions of the structural heat sink 34. The horizontal base heat sink 34A includes a hard disk drive receptacle 38. The structural heat sink 34 is formed of metal, preferably aluminum. FIG. 6 is a front perspective view of the structural heat sink 34 with a hard disk drive 70 positioned therein. The hard disk drive 70 is positioned within the receptacle 38 and thereby allows the hard disk drive 70 to be in a stationary and secure low center of gravity position that is minimally affected by incidental jostling of the housing 20. The receptacle 38 and housing 36 are preferably formed of aluminum and thereby serve to conduct heat away from the elements positioned therein. FIG. 7 illustrates the horizontal vented exterior skin 80, a rear vertical vented exterior skin 82 and a front vertical vented exterior skin 84.

U.S. Pat. No. 4,642,715 to Ende is directed towards an environmental conditioning and safety system for disk-type mass memories. FIGS. 1 and 2 illustrate an environmental conditioning and safety system (ECSS) for disk-type mass memories 10. ECSS 10 is mounted, as shown in the drawings, directly on the generally rectangular cover plate 12 of a disk housing containing rotating disks 14 as well as read/write heads and their actuating assemblies. Cover plate 12 is preferably fabricated of metal, and most preferably is an aluminum alloy casting. As shown in FIGS. 4–6, ECSS 10 includes means for exchange of air between the head/disk compartment 22 and the surrounding atmosphere. The air exchange means includes an air exchange manifold 24 and a removable manifold cover 26. The air exchange means of ECSS 10 also includes air intake means, preferably comprising a pair of air inlet check valves 32, 34, as well as air exhaust means, preferably comprising an air outlet check valve 36. ECSS 10 also includes means for dissipation of heat, which in the preferred embodiment comprises ribs or fins which are formed integrally with cover plate 12. As shown in FIG. 2, a plurality of fins 104 may be arranged in parallel, spaced relation along the exterior of cover plate 12, where they act to transfer heat generated within head/disk compartment 22 to the outside environment, to be dissipated by natural or forced air cooling.

U.S. Pat. No. 5,650,912 to Katsui et al is directed towards a heat sink for cooling a heat producing element and application. FIGS. 2 to 4B shown the heat sink H. The heat sink H comprises a heat sink body 1 made of material such as aluminum, having a good heat conductivity, and a fan assembly 2 such as a microfan for air-cooling the heat sink body 1. The heat sink body 1 comprises a fixing wall 4 whose back is mounted on a heat producing element 3, and a top plate 29 supported by upright rectangular bar 7A protruding from four corners of the fixing wall 4, respectively. Ventilation pads 5 are formed between the top plate 29 and the fixing wall 4 and open to the sides of the heat sink H. The center of the top plate 29 has a circular hole serving as a fan receiving recess 30 with the fixing wall 4 serving as the bottom thereof. The set of radiating fins 6 shaped like a comb are formed over the top plate 29 and a set of radiating fins 4a also shaped like a comb are formed over the fixing wall 4.

U.S. Pat. No. 5,535,094 to Nelson et al is directed towards an integrated circuit package with an integral heat sink and fan. FIGS. 2 and 3 illustrate module 12, which includes a cooling subsystem 22 that is mounted to an integrated circuit package 24. The package 24 typically contains an integrated circuit 26, although the package 24 may contain other electronic devices. The cooling subsystem 22 includes a heat sink 28 which is attached to the top surface of the package 24. The heat sink 28 typically has a plurality of walls 30 separated by a plurality of channels 32. Heat sink 28 is typically constructed from a thermally conductive material such as aluminum or copper. The heat generated by the integrated circuit 26 conducts through the package 24 and into the heat sink 28. Mounted to the heat sink 28 is a blower 34 which has an air intake port 36 and an exhaust port 38. The blower 34 generates a stream of air that flows from the exhaust port 38.

U.S. Pat. No. 5,638,895 to Dodson is directed towards a twin fan cooling device. As shown in the Figures, cooling device 10 is mounted upon an electronic component, such as a semiconductor component or a processor 90 that is sensitive to heat. Processor 90 is plugged into socket 95. Cooling device 10 generally comprises a heat sink 20 and a plurality of fans 110, such as left fan 110L and right fan 110R. Heat sink 20 may be constructed out of any suitable material having a high coefficient of thermal conductivity, such as aluminum or copper or their alloys. Heat sink 20 generally comprises a base plate 22 and a number of heat-dissipating fins 70. Bottom 24 of base plate 22 includes a contact surface 26 adapted for substantial surface contact with the heat-emitting surface 92 of the electronic component 90.

Based upon the foregoing, it can be observed that all of the relevant prior art fails to provide an efficient cooling mechanism which adequately resolves the need of increased heat dissipation removal without any significant increase in the need for space within an existing computer chassis.

SUMMARY OF THE INVENTION

The present invention provides increased cooling for hard disk drives and other temperature-sensitive computer components, but in a manner which is extremely space efficient. More specifically, in the present invention, the conventional rails of a standard computer chassis are removed and elongated heat sink members, having substantially the same general dimensions as the rails, are substituted for the rails to provide highly conductive heat transfer from the hard disk drive to which the heat sink members are connected. Moreover, the heat sink members are provided with channels along their entire length through which air flow can be directed to provide additional heat removal by convection. Air flow is preferably facilitated by use of small fans located at the ends of the heat sink members, at least one such fan for each such heat sink member which fits within the width and height outline of the disk drive/heat sink member combination thereby requiring minimal space and no alteration to existing computer chassis dimensions. In a preferred embodiment, a thermally conductive pad is positioned between the heat sink members and the respective mating surfaces of the disk drive or other component to facilitate enhanced heat conduction therebetween.

OBJECTS OF THE INVENTION

It is therefore a principal object of the invention to provide an apparatus for increasing the cooling of temperature critical computer components without significantly increasing the volume required in a computer chassis.

It is another object of the invention to provide conductive and convective cooling of computer components within a computer chassis.

It is still another object of the invention to provide enhanced cooling of hard disk drives within a confined space.

It is still an additional object of the invention to provide additional cooling of heat sensitive computer components without a substantial increase in required computer chassis volume.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF PREFERRED EMBODIMENTS

Figure 1:
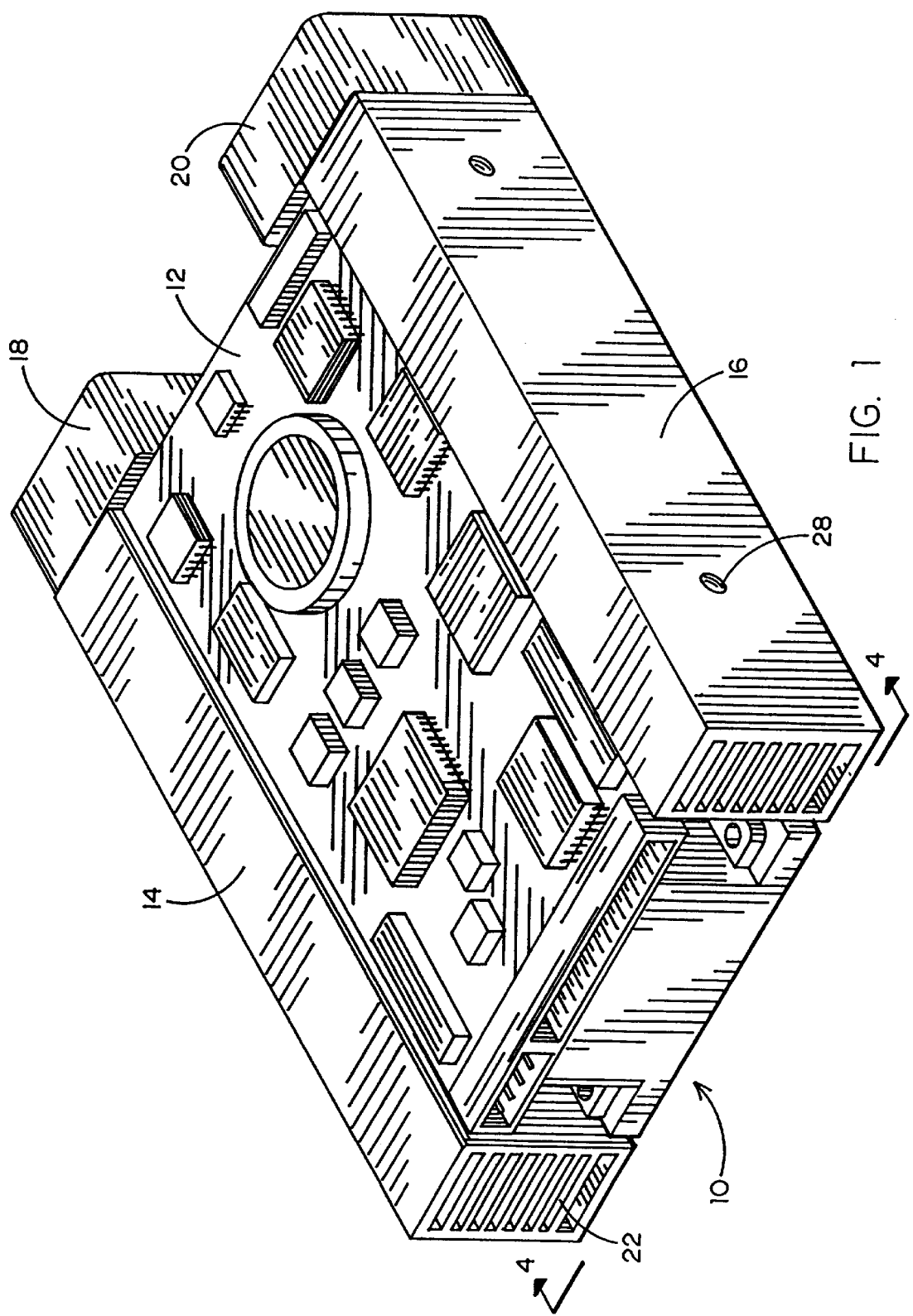
FIG. 1 is a rear-oriented three-dimensional view of a preferred embodiment of the invention.

Referring to the accompanying figures, it will be seen that a forced air cooled hard disk drive assembly 10 in accordance with the present invention, comprises a hard disk drive 12 attached to a pair of heat sink members 14 and 16. The heat sink members preferably extend the full length of the hard disk drive. More importantly, the heat sink members 14 and 16 are designed in shape and size to replace conventional computer chassis rails found in desk top computers having 5.5 inch component bays. The heat sink members are provided with screw holes 28 which are threaded and located in the same way as conventional rails for mounting in the computer chassis.

In this way, heat sink members 14 and 16 take up no additional space within the computer chassis and permit installation of the hard disk drive 12 in precisely the same volume as it would occupy using conventional rails to install it.

Heat sink members 14 and 16 are rectangular in cross-section and comprise a plurality of cooling fins 22, spaced from one another to provide a plurality of channels 27. Fins 22 and channels 27 preferably extend the full length of the heat sink members to permit air flow entirely through the heat sink members.

Figure 2:
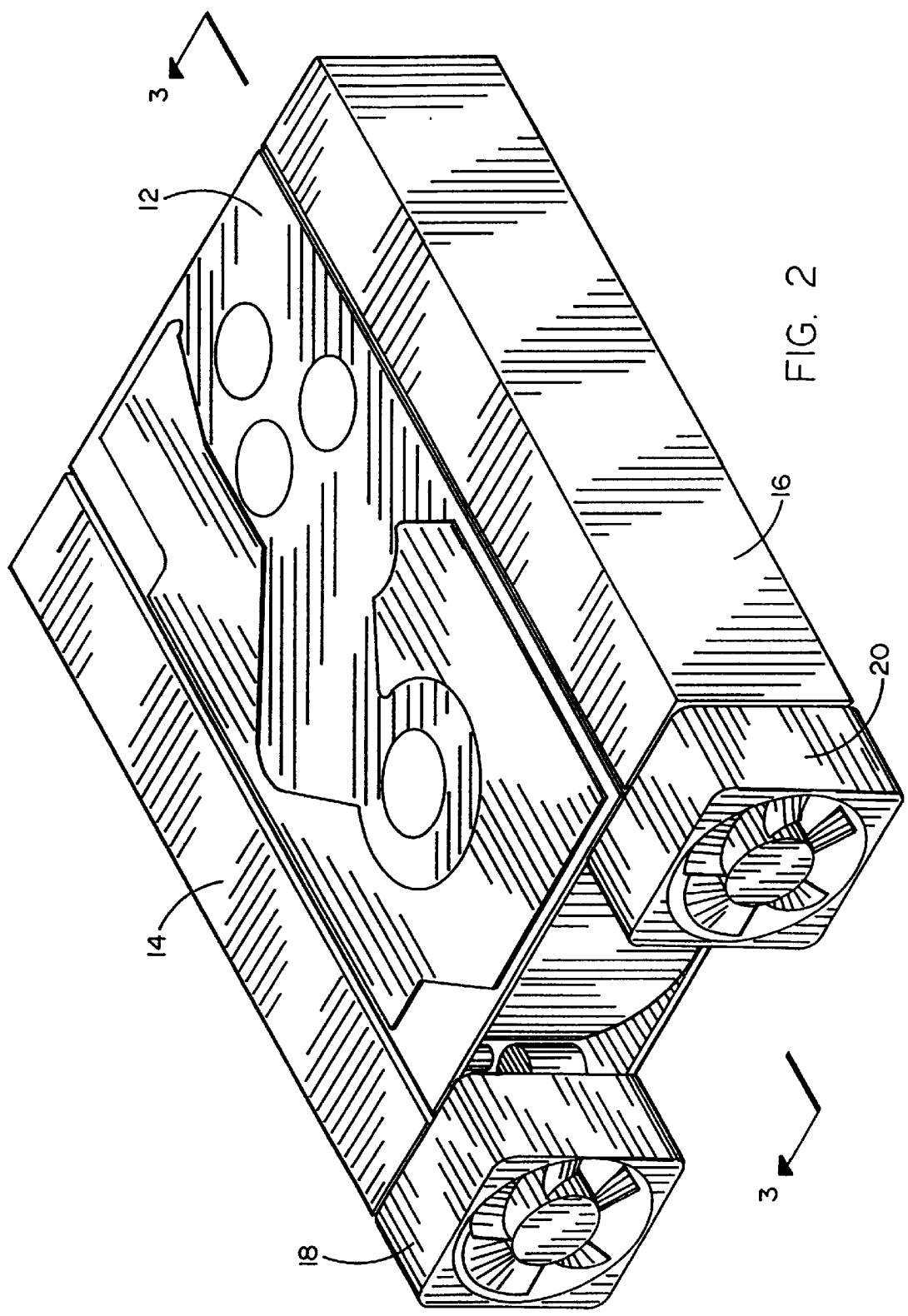
FIG. 2 is a front-oriented three-dimensional view of the embodiment of FIG. 1.

Air flow through heat sink members 14 and 16 is facilitated in the preferred embodiment 10 by fans 18 and 20, respectively. As shown best in FIG. 2, fans 18 and 20 are preferably about the same height as the heat sink members which are, in turn, about the same height as the disk drive 12. The fans 18 and 20 are preferably off-the-shelf components having a generally square shape and may thus extend laterally beyond the width of the heat sink members and partially overlap the disk drive 12. Significantly, fans 18 and 20 have an envelope which does not extend beyond the height or width of the assembly 10, requiring only additional length which is typically available within a standard equipment bay of even a crowded computer chassis.

Figure 3:
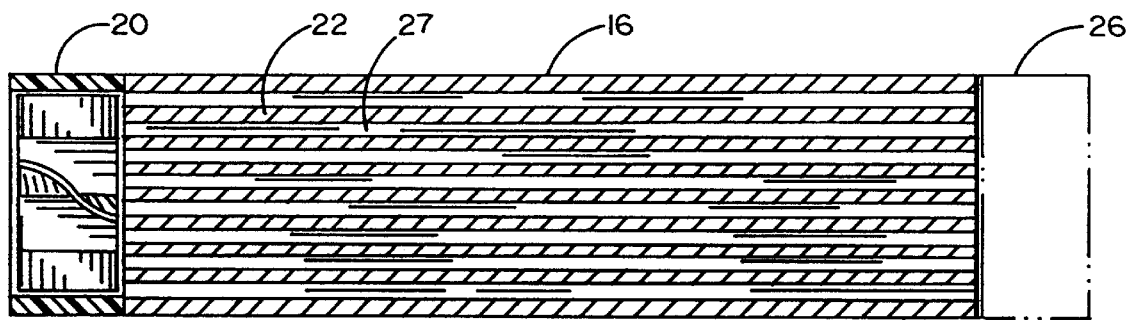
FIG. 3 is a cross-sectional view taken along lines 3—3 of FIG. 2.
Figure 4:
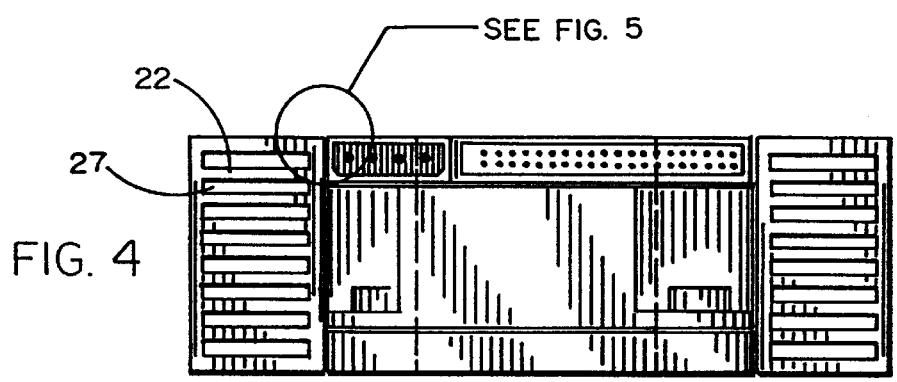
FIG. 4 is a rear view taken along lines 4—4 of FIG. 1.
Figure 6:
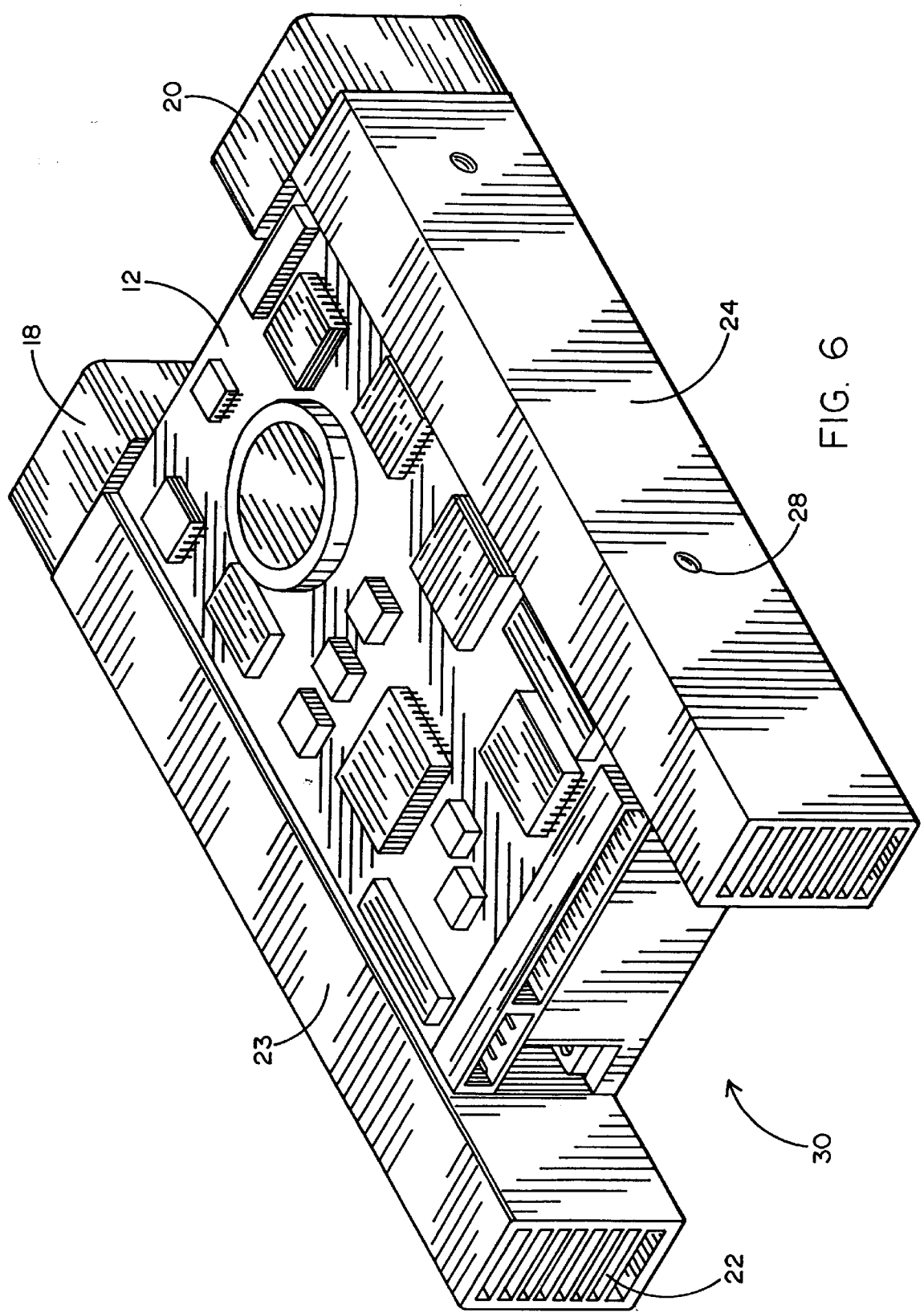
FIG. 6 is a rear-oriented three-dimensional view of an alternative embodiment of the invention.

The availability of space along the front-to-rear direction of a typical computer chassis equipment bay, also facilitates the use of two additional fans (such as fan 26 shown in phantom in FIG. 3) at the opposite ends of heat sink members 14 and 16 to further increase forced air flow through the channels 27. It will be understood that such additional fans cannot interfere with access to electrical contact plugs normally employed to connect the hard disk drive to computer power and signal buses. The alternative embodiment of the invention shown in FIG. 6 overcomes this potential access-interference problem by providing an assembly 30 which employs extended length heat sink members 23 and 24. In all other respects the embodiment of FIG. 6 is identical to the embodiment of FIG. 1.

Figure 5:
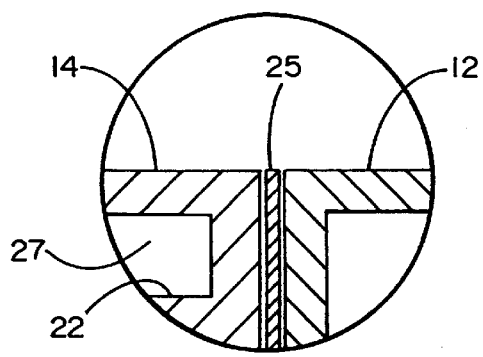
FIG. 5 is an enlarged view of the encircled area in FIG. 4.

Heat sink members used in the present invention are, preferably, thermally conductive members made, for example, of aluminum, aluminum alloys and the like. However, in order to further enhance the conduction of thermal energy from disk drive to heat sink members, the preferred embodiment utilizes a thermally conductive pad 25 shown in FIG. 5. One such pad is available from the Berquist Company of Minneapolis, Minn. under the trademark Q-Pad 3 which is a five thousandths inch thick, graphite imbedded polymer matrix with an elastomer on one surface and an adhesive on the other. The elastomer will conform to slight variations in surface texture of the sides of the disk drive thus maximizing surface contact to further improve thermal energy transfer. More active cooling may also be employed such as thermoelectric cooling (i.e., Peltier cooler) to "pump" heat from the disk drive to the heat sink members.

Figure 7:
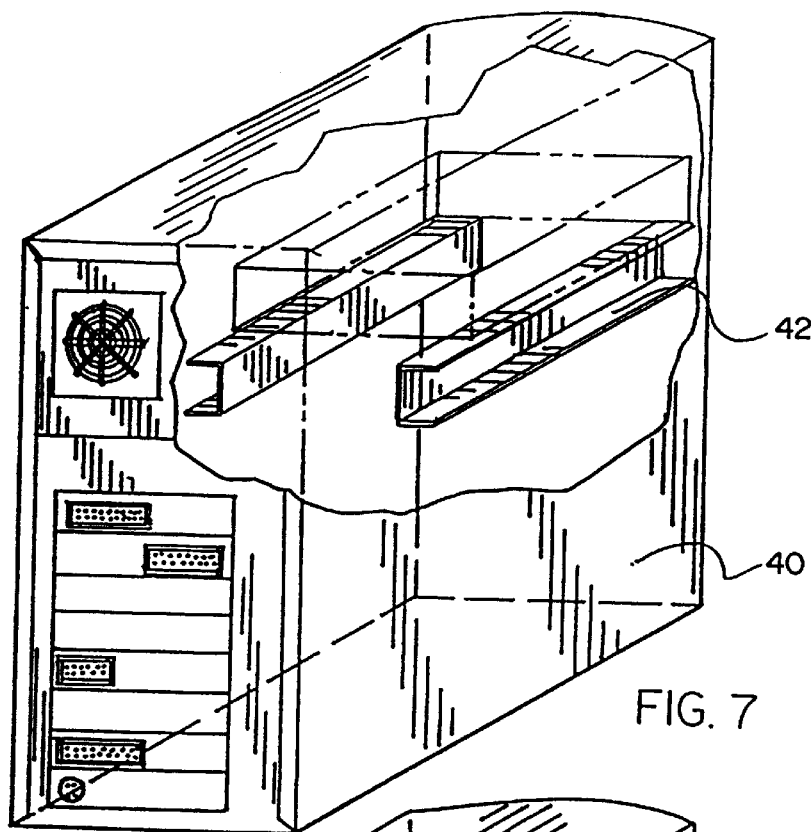
FIGS. 7 and 8 illustrate in partially broken-away views, a computer chassis frame with conventional side rails in FIG. 7 and with the inventive cooling assembly substituted for removed rails in FIG. 8.
Figure 8:
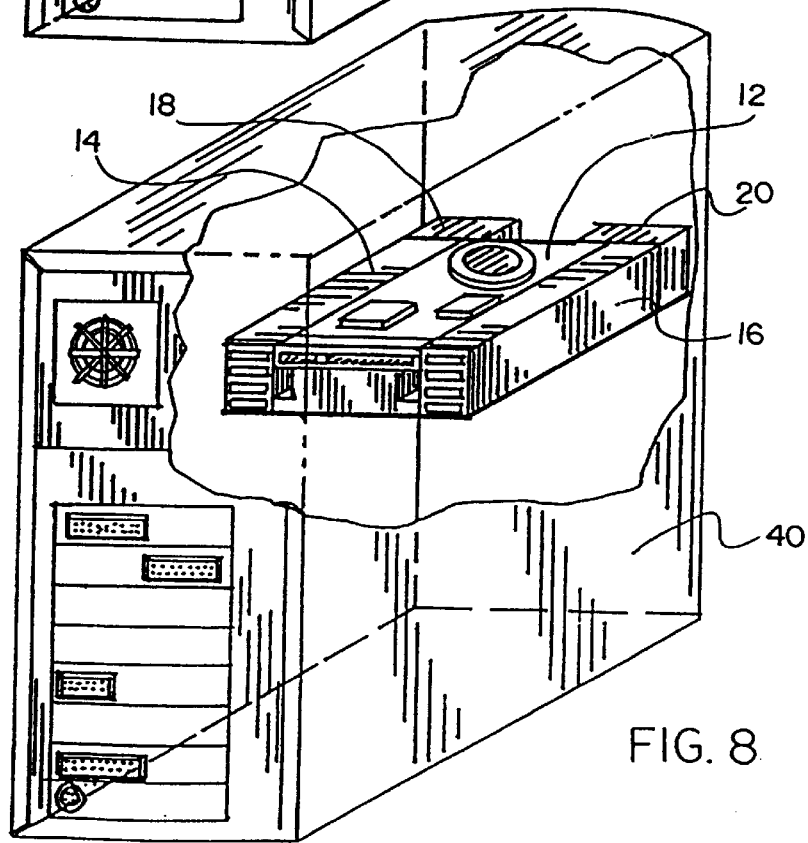

FIGS. 7 and 8 illustrate the "before" and "after" of a computer chassis frame 40 wherein rails 42 shown in FIG. 7 are removed and replaced by heat sink members 14 and 16, as well as fans 18 and 20 in FIG. 8.

It will now be understood that the present invention provides a unique apparatus for meeting the objects of invention stated herein. Those having skill in the related arts will now perceive additions and modifications which may be made to the invention. By way of example, the assembly herein disclosed, may be readily employed to cool other computer-related components such as CD-ROM drives, DVD-ROM drives and tape back-up units. Thus, it will be understood that the disclosed embodiments are illustrative and not necessarily limiting in regard to the scope of protection afforded hereby.

Accordingly, the scope of the invention is to be limited only by the claims appended hereto and their equivalents.

I claim:

1. A computer component cooling assembly for conductive cooling of a computer component within a generally enclosed computer chassis frame, the chassis of the type in which components are secured by side rails to the chassis frame; the assembly comprising:

a pair of heat sink members, each said member having a plurality of air flow channels positioned between opposed surfaces, one of said surfaces being affixed to a computer component to be cooled and the other of said surfaces being connected directly to said chassis frame instead of said rails.

2. The assembly recited in claim 1 wherein both of said members extend along substantially the entire length of said component.

3. The assembly recited in claim 1 wherein both of said members extend beyond the entire length of said component.

4. The assembly recited in claim 1 further comprising a thermally conductive pad positioned between each said member and said computer component.

5. The assembly recited in claim 1 wherein said computer component comprises a hard disk drive.

6. The assembly recited in claim 1 wherein said air flow channels extend the entire distance between said opposed surfaces.

7. The assembly recited in claim 1 wherein at least one of said surfaces extends along substantially the entire length of said members.

8. The assembly recited in claim 7 wherein said at least one surface is said surface affixed to said computer component.

9. A computer disk drive cooling assembly for conductive and convective cooling of a computer disk drive within a generally enclosed computer chassis frame, the chassis of the type in which disk drives are secured by side rails to the chassis frame; the assembly comprising:

a pair of heat sink members, each said member having a plurality of air flow channels positioned between opposed surfaces, one of said surfaces being affixed to a computer disk drive to be cooled and the other of said surfaces being connected directly to said chassis frame instead of said rails.

10. The assembly recited in claim 9 wherein said members extend along substantially the entire length of said disk drive.

11. The assembly recited in claim 9 wherein said members extend beyond the entire length of said disk drive.

12. The assembly recited in claim 9 further comprising a thermally conductive pad positioned between each said member and said computer disk drive.

13. The assembly recited in claim 9 wherein said air flow channels extend the entire distance between said opposed surfaces.

14. The assembly recited in claim 9 wherein at least one of said surfaces extends along substantially the entire length of said members.

15. The assembly recited in claim 14 wherein said at least one surface is said surface affixed to said disk drive.

\* \* \* \* \*